United States Patent [19]
Higgins

[11] Patent Number: 5,635,724
[45] Date of Patent: Jun. 3, 1997

[54] METHOD AND APPARATUS FOR DETECTING THE LOCATION OF AN OBJECT ON A SURFACE

[75] Inventor: James C. Higgins, Woodstock, Ga.

[73] Assignee: Intecolor, Duluth, Ga.

[21] Appl. No.: 478,919

[22] Filed: Jun. 7, 1995

[51] Int. Cl.⁶ ............................................. G01N 21/86
[52] U.S. Cl. ..................... 250/559.19; 250/559.12; 250/559.29
[58] Field of Search ............ 250/559.24, 559.19, 250/559.21, 559.27, 559.12, 221, 222.2, 224, 559.29; 340/555–557

[56] References Cited

U.S. PATENT DOCUMENTS

| | | | |
|---|---|---|---|
| 4,243,879 | 1/1981 | Carroll et al. | 250/221 |
| 4,267,443 | 5/1981 | Carroll et al. | 250/221 |
| 4,384,201 | 5/1983 | Carroll et al. | 250/221 |
| 4,467,193 | 8/1984 | Carroll | 250/216 |
| 4,645,920 | 2/1987 | Carroll et al. | 250/221 |
| 4,672,364 | 6/1987 | Lucas | 250/221 |
| 4,684,801 | 8/1987 | Carroll et al. | 250/221 |
| 4,703,316 | 10/1987 | Sherbeck | 340/706 |
| 4,713,534 | 12/1987 | Masters et al. | 250/214 B |
| 4,761,637 | 8/1988 | Lucas et al. . | |
| 4,794,248 | 12/1988 | Gray | 250/221 |
| 4,799,044 | 1/1989 | Masters et al. | 250/221 |
| 4,818,859 | 4/1989 | Hough | 250/221 |
| 4,847,606 | 7/1989 | Beiswenger | 340/712 |
| 4,855,590 | 8/1989 | Bures et al. | 250/221 |
| 4,899,138 | 2/1990 | Araki et al. | 340/712 |
| 4,912,316 | 3/1990 | Yamakawa | 250/221 |
| 4,943,806 | 7/1990 | Masters et al. | 341/31 |
| 4,988,983 | 1/1991 | Wehrer | 341/31 |
| 4,990,901 | 2/1991 | Beiswenger | 340/712 |
| 5,136,156 | 8/1992 | Nounen et al. | 250/221 |

FOREIGN PATENT DOCUMENTS 2-282214  11/1990  Japan .

*Primary Examiner*—Que Le
*Attorney, Agent, or Firm*—Needle & Rosenberg, P.C.

[57] ABSTRACT

A device and method for detecting the location of an object in a surface employs a first plurality of light sources disposed along a first row adjacent the surface. A first plurality of light detectors is disposed along a second row adjacent the surface and spaced apart from the first row. Each detector outputs an analog signal representative of the intensity of light being detected. A control means causes each of the light sources to be illuminated at a different time. A calculating means determines the location of the object based on the analog signals from the detectors. The calculating means determines the location of the object by determining coordinates of a first line and a second line, the first line extending from a first light source to a centerpoint of a first shadow cast upon a first neighboring group of the detectors and the second line extending from a second light source to a centerpoint of a second shadow cast upon a second neighboring group of the detectors. The calculating means determines the location of each shadow end as being a point a distance from an end of a detector equal to the width of the detector times the value of the signal from the detector divided by the value of the signal corresponding to the detector being fully illuminated by a beam. In an alternative embodiment, the calculating means further determines the width of the object.

20 Claims, 7 Drawing Sheets

METHOD AND APPARATUS FOR DETECTING THE LOCATION OF AN OBJECT ON A SURFACE

FIELD OF THE INVENTION

The present invention relates to optical devices, and in particular to a device (such as a touch screen) using light sources and analog light detectors to determine the position of an object.

DESCRIPTION OF THE PRIOR ART

Devices employing light beams and detectors to determine the location and size of objects can find many applications. These include touch screens placed in front of computer displays to provide input information to a computer. Several such touch screens are found in the prior art.

U.S. Pat. No. 4,703,316, issued to Sherbeck, discloses a touch panel input apparatus including two arrays of light detectors placed on the opposite sides of a display screen. One light source is placed at each corner of the display, with the sources on one side illuminating the detectors on the opposite side. The detectors indicate whether or not the light beam to the detector is being interrupted by an object. A microprocessor determines the midpoint of the interrupting object to be the point in the middle of all the detectors interrupted by the object. Equations are used to determine both the X & Y positions of the object from the interrupted detectors.

U.S. Pat. No. 4,899,138, issued to Araki et al., discloses a touch panel control device. Light sources and detectors are disposed along all four sides of a panel. The detectors sense the blockage of light from the sources and do not indicate the intensity of the light being received by the detectors.

U.S. Pat. Nos. 4,847,606 and 4,990,901, issued to Beiswenger, disclose a liquid crystal display touch screen employing a source and detector of electromagnetic radiation. The touch screen detects the presence of an object if light from the source is detected below a threshold level. Detectors are disposed along both the X and Y axes in order to detect the XY position of an object.

None of the above references disclose a device using light sources and analog detectors that detects the location of an object with precision not limited by the number of detectors used.

None of the above references disclose a device having light sources and detectors disposed parallel to a single axis that can locate an object relative to two orthogonal axes.

Also, none of the above references disclose a device that can determine the width of an object.

SUMMARY OF THE INVENTION

The present invention is a device and method for detecting the location of an object in a surface. It comprises a first plurality of light sources disposed along a first row adjacent the surface. Each light source produces a divergent beam and is capable of being illuminated at a different time. When the object intersects the surface, the object occludes a portion of the beams from at least two different light sources at different times. A first plurality of light detectors is disposed along a second row adjacent the surface and spaced apart from the first row. The beam from each of the light sources is directed to at least one light detector. Each light detector has a detecting surface sensitive to light of the waveband (such as infrared) produced by the light sources and each light detector generates an analog signal representative of the intensity of light being detected.

A control means causes each of the light sources to be illuminated at a different time. A calculating means, which is responsive to the control means, determines the location of the object based on the analog signals from the plurality of detectors. The control means and the calculating means could both be embodied in a digital computer, or could comprise separate combinatorial logic elements.

The calculating means determines the location of the object by determining coordinates of a first line and a second line. The first line extends from a first light source to a centerpoint of a first shadow cast by the object upon a first neighboring group of the detectors and the second line extends from a second light source to a centerpoint of a second shadow cast by the object upon a second neighboring group of the detectors. The location of the object is at the intersection of the first line and the second line. To determine the centerpoint of each shadow, the calculating means calculates one half of the distance from a first shadow end to a second shadow end. The calculating means determines the location of each shadow end as being a point a distance from an end of a detector equal to the width of the detector times the value of the signal from the detector, divided by the value of the signal corresponding to the detector being fully illuminated by a beam.

In an alternative embodiment, the calculating means further determines the width of the object. The object casts a first shadow, having an first upper end and an opposite first lower end, on the plurality of detectors when illuminated by a first light source of the plurality of light sources. The object casts a second shadow, having a second upper end and an opposite second lower end, on the plurality of detectors when illuminated by a second light source of the plurality of light sources. The calculating means then determines the coordinates of a first upper line from the first light source to the first upper end of the first shadow, a first lower line from the first light source to an the first lower end of the first shadow, a second upper line from the second light source to the second upper end of the second shadow, and a second lower line from the second light source to the second lower end of the second shadow. The calculating means then determines the width of the object by calculating a distance between a first intersection point and a second intersection point, where the first intersection point is a point where the first upper line intersects the second upper line. Similarly, the second intersection point is the point where the first lower line intersects the second lower line.

In an alternative preferred embodiment, the device further comprises a second plurality of light sources evenly spaced apart and interleaved with the first plurality of light detectors and a second plurality of light detectors evenly spaced apart and interleaved with the first plurality of light sources.

Because of the use of the analog output of the detectors, representing the intensity of the light being detected, the resolution to which the present invention can determine the edge of a shadow is limited only by the precision of the detectors and their associated electronics, not by the number of detectors used.

It is, therefore, an object of this invention to detect the location of an object using light sources and analog detectors such that the precision is not limited by the number of detectors used.

It is a further object of the present invention to locate an object relative to two orthogonal axes with light sources and detectors disposed parallel to a single axis.

It is a further object of the present invention to determine the width of an object with light sources and detectors.

These and other objects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
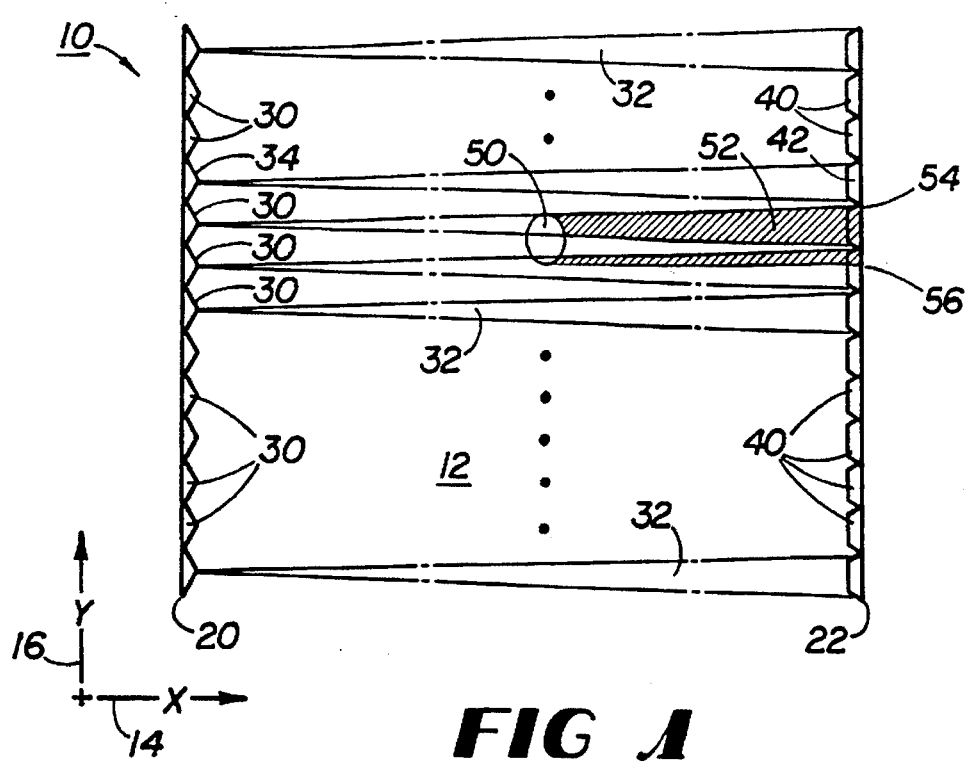
FIG. 1 is a schematic view of the present invention.

A preferred embodiment of the invention is now described in detail. Referring to the drawings, like numbers indicate like parts throughout the views.

As shown in FIG. 1, the present invention 10 is a device that determines the location of an object 50 with respect to two axes: an x-axis 14 and a y-axis 16. In one embodiment, it comprises a first plurality of light sources 30 disposed along a first row 20 adjacent a surface 12. The surface 12 may be either flat or curved and may be used as a surface adjacent a computer monitor. Each light source 30 produces a divergent beam 32 and each is capable of being illuminated at a different time.

A first plurality of light detectors 40 is disposed along second row 22, the second row 22 being adjacent the surface 12 and spaced apart from the first row 20 so that the light from each of the light sources 30 is directed to at least one of the light detectors 40. Each light detector 40 is sensitive to light of the waveband produced by the light sources 30 and each light detector 40 generates an analog signal representative of the intensity of light being detected.

When an object 50 intersects the surface 12, the object 50 occludes a portion of the beams from at least one of the light sources 30 at different times, thereby casting a shadow 52 on at least part some of the detectors 40. The shadow has a first shadow end 54 and a second shadow end 56, both of which are detectable by the detectors 40.

Figure 2:
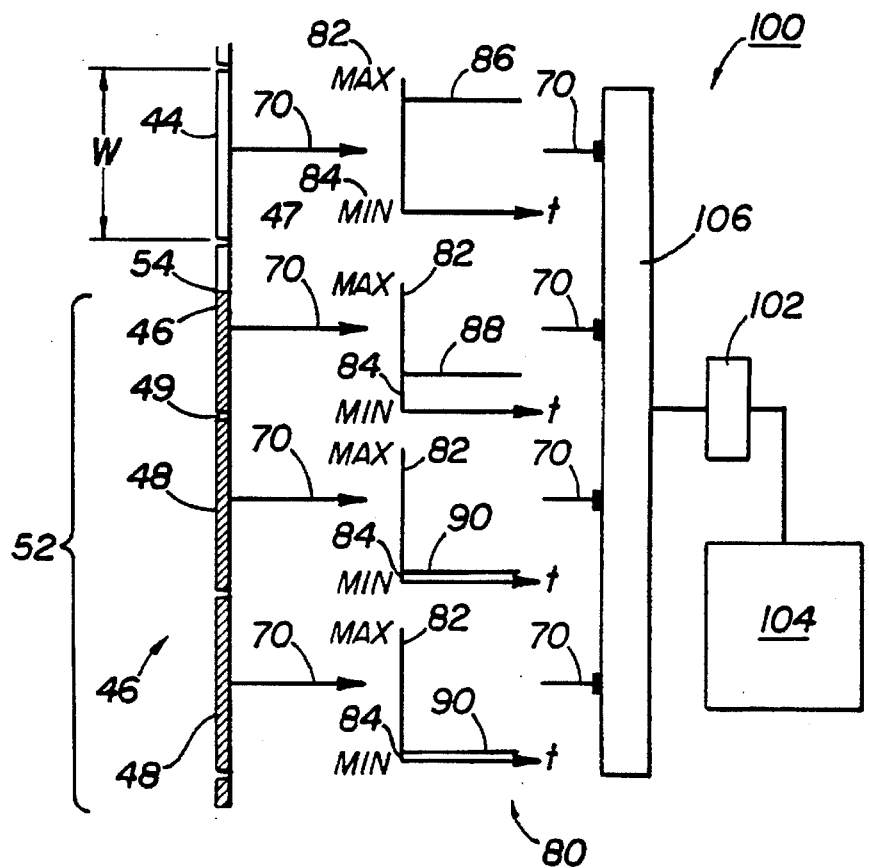
FIG. 2 is a schematic detail view showing a representative number of detectors.

Referring to FIG. 2, to understand how the detectors 40 detect the shadow ends, such as the first shadow end 54, consider part of a shadow 52 projected onto a representative subset of the detectors 40. At the first shadow end 54, the shadow 52 partially occludes detectors 46 and fully occludes several of the detectors 48, while other detectors 44 remain unoccluded.

Each detector 40 generates an analog signal 70 representative of the intensity of light to which the detector is exposed. In FIG. 2, these analog signals 70 are represented by a series of graphs 80 corresponding to the values of the analog signals 70 for each of the detectors 40 relative to time (t). Each graph shows a maximum value 82 corresponding to the value of the analog signal 70 when a detector 40 is fully exposed to light from one of the sources 30 and a minimum value 84 corresponding to the value of the analog signal 70 when a detector 40 is fully occluded by a shadow 52.

The unoccluded detector 44 generates an analog signal 70 having a value 86 equal to the maximum 82. Each detector 40 has a width W and the partially occluded detector 46 has an unoccluded end 47 and an occluded end 49. In the case of the partially occluded detector 46 the value 88 of the analog signal 70 is a fraction of the maximum value 82 corresponding to the fraction of the detector 46 unoccluded by the shadow 52. The fully occluded detectors 48 generate analog signals 70 having values 90 equal to the minimum value 84.

The signals 70 are fed into a signal processor 100 which can comprise a multiplexer 106, an analog-to-digital converter (ADC) 102, and a microprocessor 104. As would be obvious to one skilled in the art, other signal processor 100 configurations could be used. The signal processor 100 determines the location of the first shadow end 54 by first determining on which detector 40 the first shadow end 54 lies. In the example shown in FIG. 2, this is the partially occluded detector 46. If there is no partially occluded detector, then the first shadow edge 54 must lie in the space between a fully occluded detector and an unoccluded detector.

To determine where on the partially occluded detector 46 the first shadow end 54 lies, the width of the detector 46 is multiplied by the value 88 of the signal 70 from the detector divided by the value corresponding to the detector's maximum 82 output had the detector 46 been completely unoccluded by the shadow 54. This calculation gives the location of the first shadow end 54. A similar calculation is performed to determine the location of the second shadow end 56, as shown in FIG. 1. As can be seen in FIG. 2, by using the analog signals 70 from the detectors 40, a much higher level of resolution can be achieved by the present invention than would be possible if the detectors 40 were to be read in a binary fashion, indicating only the presence or absence of light.

Returning to FIG. 1, the device initially scans the plane 12 to look for an object 50. It does this by sequentially illuminating each light source 30 for about one millisecond and activating its correspondingly opposite detector 40, one source-detector pair at a time. For example, light source 34 has detector 42 as its correspondingly opposite detector. If an object 50 (such as a finger or a stylus) is placed between the light sources 30 and the detectors 40, at least one of the detectors 40 will detect the presence of a shadow 52 when its corresponding light source 30 is illuminated. From this information, the device is able to determine the location of the object 50 along the y-axis 16.

Figure 3:
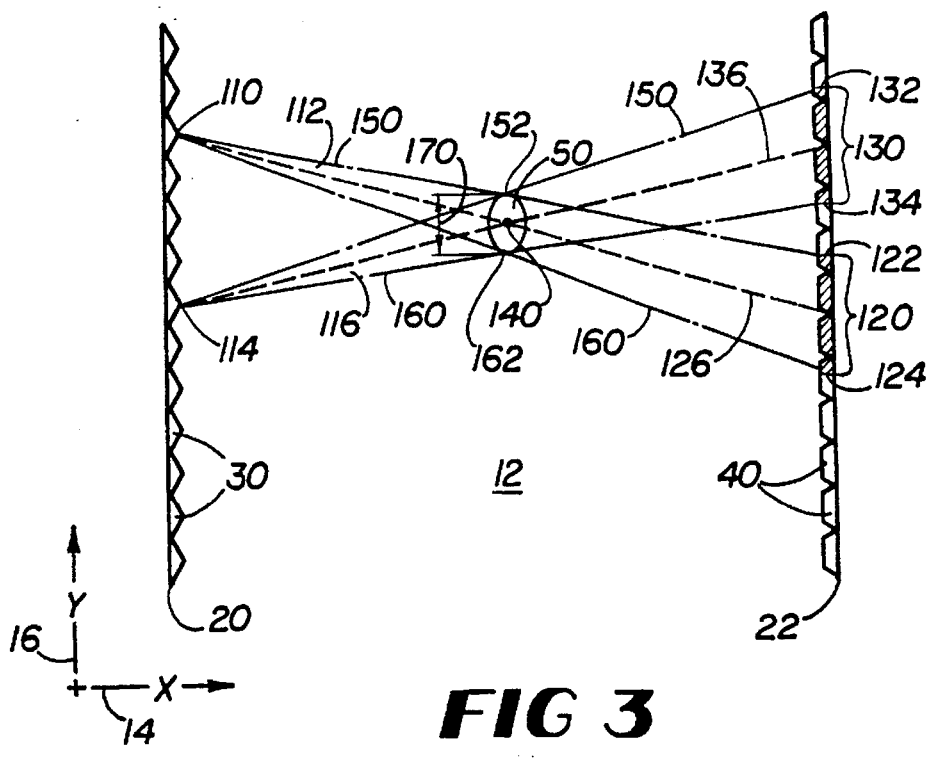
FIG. 3 is a schematic view showing one method of determining the location of an object relative to two axes.

Referring to FIG. 3, once the initial scan has located an object 50 in the plane 12 with respect to the y-axis 16, the device next determines the location of the object 50 with respect to the x-axis 14. In the embodiment shown in FIG. 3, location along the x-axis 14 is performed by illuminating at least two of the light sources 30, a first source 110 and a second source 114, at different times. When the first source 110 is illuminated it generates a first beam 112, part of which is occluded by the object 50, thereby casting a first shadow 120 on some of the detectors 40. The first shadow 120 has a first shadow end 122 and a second shadow end 124, the locations of which are determined according to the method described above. The first shadow 120 occludes a first neighboring group of detectors 123. The coordinates of a first centerline 126 from the first source 110 are determined by dividing the distance between the first shadow end 122 and the second shadow end 124 by two. The result is the distance from either shadow end, 122 or 124, to the intersection of the first centerline 126 with the row 22 of detectors 40.

The second source 114, when illuminated, also generates a second beam 116 that casts a second shadow 130, distinct from the first shadow 120, on the detectors 40. The second shadow 130 occludes a second neighboring group of detectors 133. The coordinates of a second centerline 136 are determined from the corresponding first shadow end 132 and second shadow end 134 of the second shadow 130. Once the coordinates of the first centerline 126 and the second centerline 136 are determined, the location of the object 50 is determined as being at the intersection point 140 of the first centerline 126 and the second centerline 136. This gives both the coordinate of the object 50 along the x-axis 14 and a confirmation of the coordinate along the y-axis 16.

Using this method, the initial scan indicates the presence of an object 50 and the y-axis 16 coordinate of the object 50. Then the device limits its illumination of the sources 30 to those within the vicinity of the y-axis 16 coordinate of the object 50 to determine the object's x-axis 14 coordinate. This method reduces the time required to pinpoint the location of the object 50. However, in an alternative embodiment, the initial scan may be done away with and the location of the object 50 along both the x-axis 14 and the y-axis 16 can be determined by finding a centerline from each source 30 through the object 50 as described above relative to centerlines 126 and 136.

In an alternative embodiment, the present invention can also be used to determine the width 170 of the object 50 relative to the y-axis 16. In this embodiment, the coordinates of at least two lines 150 from each of the sources 110 and 114 to each of the corresponding first shadow ends 122 and 132 are determined. The intersection point 152 of the lines 150 coincides essentially with the top-most point of the object 50. Similarly, two lines 160 from the sources 110 and 114 to their respective second shadow ends 124 and 134 result in a second intersection point 162 that coincides essentially with the bottom-most point of the object 50. The distance between the two intersection points 152 and 162 defines the approximate width 170 of the object 50.

Figure 4:
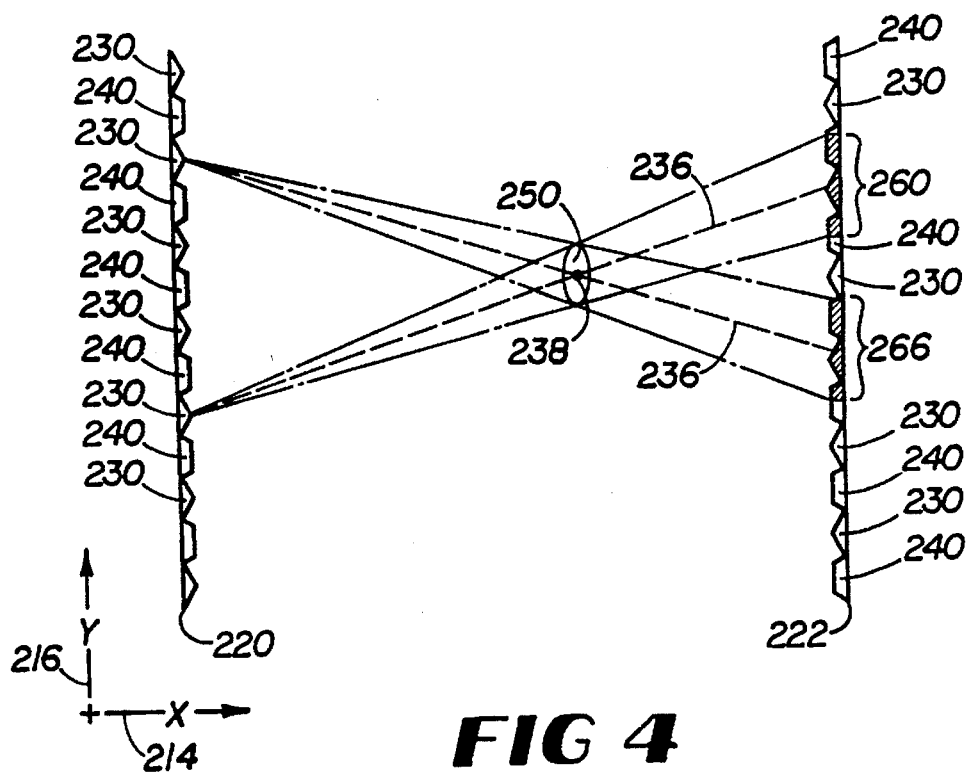
FIG. 4 is a schematic view showing an alternative embodiment having interleaved light sources and detectors.

Referring to FIG. 4, in an alternative preferred embodiment the light sources 230 and the detectors 240 are disposed in an interleaved fashion along a first row 220 and a second row 222. In this embodiment, the initial scan to determine the location of the object 250 with respect to the y-axis 216 is performed as described above. The location of the object 250 with respect to the x-axis 214 can be performed using one of two methods. The first method is similar to the method described above in which at least two detectors 230 are illuminated at different times, thereby casting at least two shadows 260, 266 on the opposite row 220. The centerlines 236 from the illuminating light sources 230 to the shadows 264, 266 are determined as described above and the location of the object 250 with respect to the x-axis 214 is determined from the intersection point 238 of the two centerlines 236. This method may involve illuminating multiple sources 230 from both rows 220, 222 to improve precision and accuracy.

Figure 5:
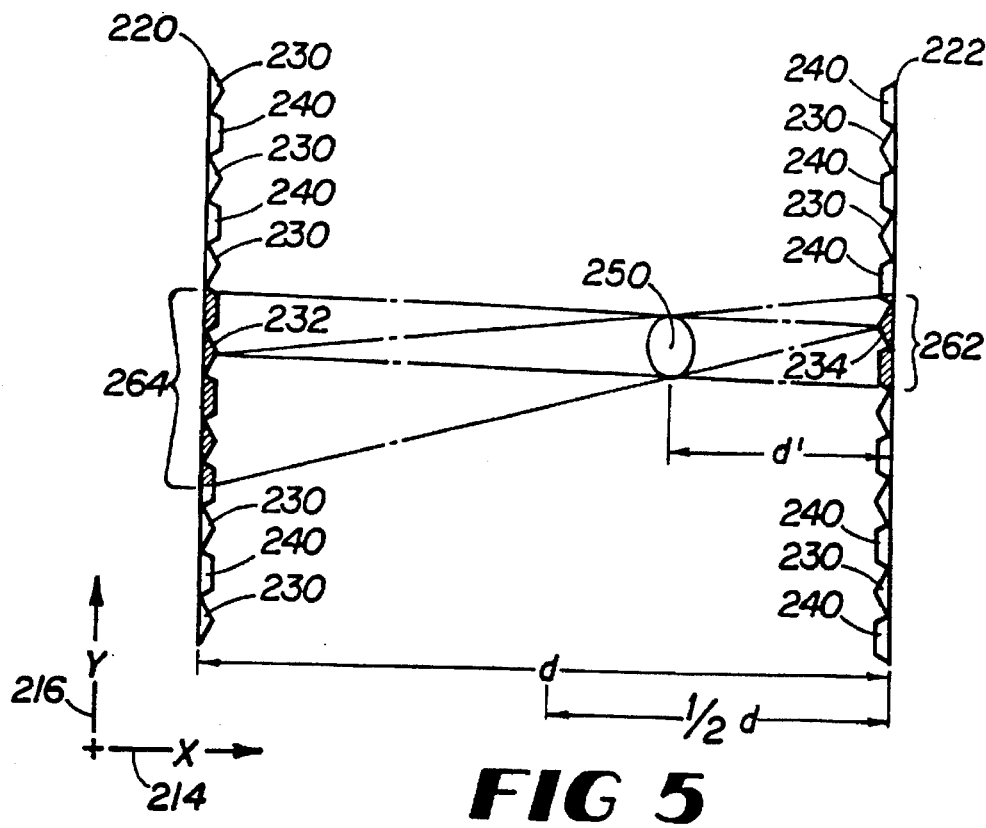
FIG. 5 is a schematic view showing an alternative method of determining the location of an object relative to two axes.

As shown in FIG. 5, the second method involves illuminating a first source 232 of a first plurality of light sources 230 disposed on the first row 220 and a second source 234 of a second plurality of light sources 230 disposed on the second row 222. The first source 232 and the second source 234 are each disposed opposite two detectors 230 having a y-axis 216 coordinate close to that of the object 250 and are chosen after the initial scan. The object 250 occludes some of the light from the first source 232 and casts a first shadow 262 on a portion of the second row 222 and, likewise, occludes some of the light from the second source 234 and casts a second shadow 264 on a portion of the first row 220. The widths of the shadows are determined from the shadow ends as described above. The location of the object 250 along the x-axis 214 is determined by dividing the width of the narrower shadow On this example the first shadow 262) by the width of the wider shadow (in this example the second shadow 264) and multiplying the resulting quotient by one half the distance d between the two rows 220, 222. The resulting product is multiplied by a correction factor to account for the width of the object and the distance between sources and detectors. The product of this multiplication is the distance d' of the object 250 from the row onto which the narrower shadow is cast (in this example the second row 222).

Figure 6:
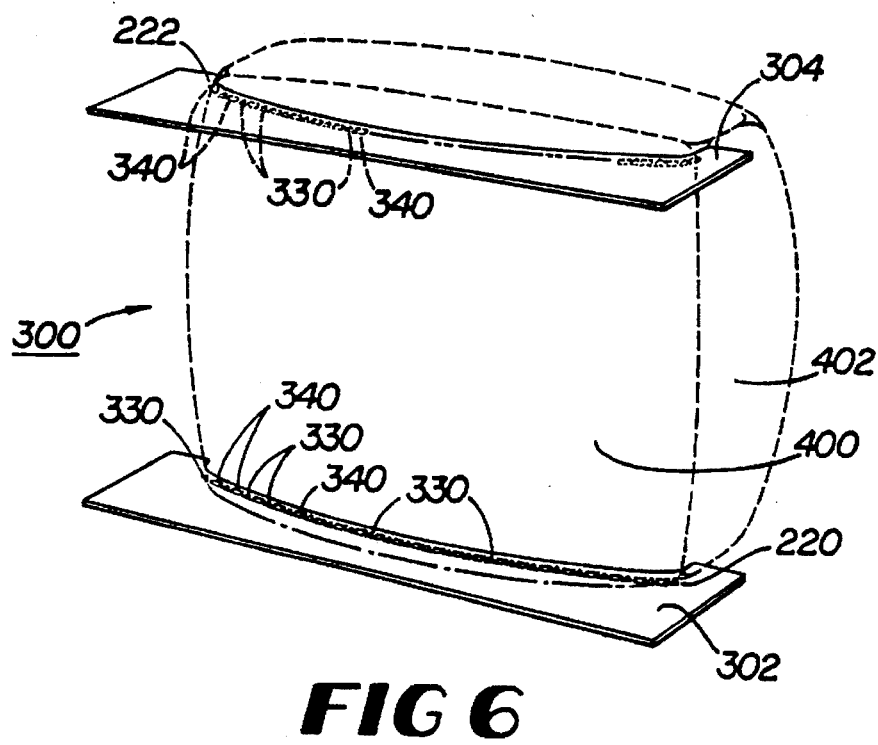
FIG. 6 is a top right side perspective view of a touch screen in accordance with the present invention disposed adjacent a cathode ray tube.

As shown in FIG. 6, a preferred embodiment of the present invention is employed in a touch screen 300 disposed about the viewing surface 400 of a cathode-ray tube (CRT) 402. It comprises a first circuit board 302 and an oppositely disposed second circuit board 304 on which the detectors 340 and sources 330 are disposed. The detectors 340 can be disposed on a separate board 302 or 304 from the sources 330 or they can be interleaved with each other on the same board 302 or 304. In this embodiment the circuit boards 302, 304 are disposed along the top and the bottom of the viewing surface 400 because this dimension is shorter that the distance between the two sides. However, the circuit boards 302, 304 may also be disposed along the two sides of the viewing surface 400.

To reduce the effects of ambient light, the detectors 340 may be enveloped by a shroud (not shown) made of a material that is transparent to infrared light, but opaque to other wavelengths of light. The sources 330 are chosen to emit infrared light and the detectors 240 are chosen to detect only infrared light. Other ways to reduce the effects of ambient light include periodic sampling of the ambient light and subtracting its intensity from the measured light from the sources 330, as well as other methods obvious to those skilled in the art of touch screen design.

Figure 7A:
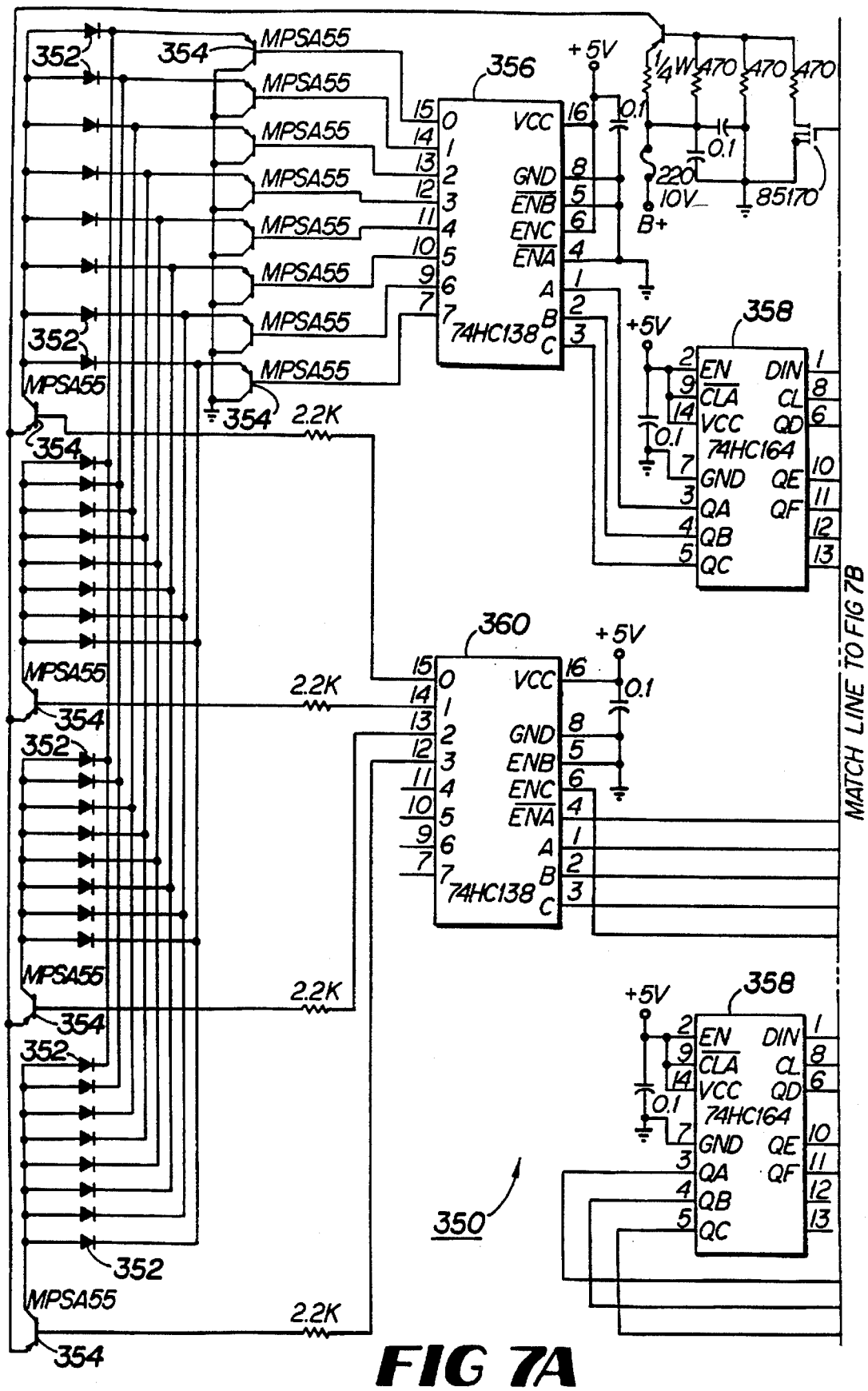
FIG. 7 is a schematic view of the control electronics employed in one embodiment of the present invention.
Figure 7B:
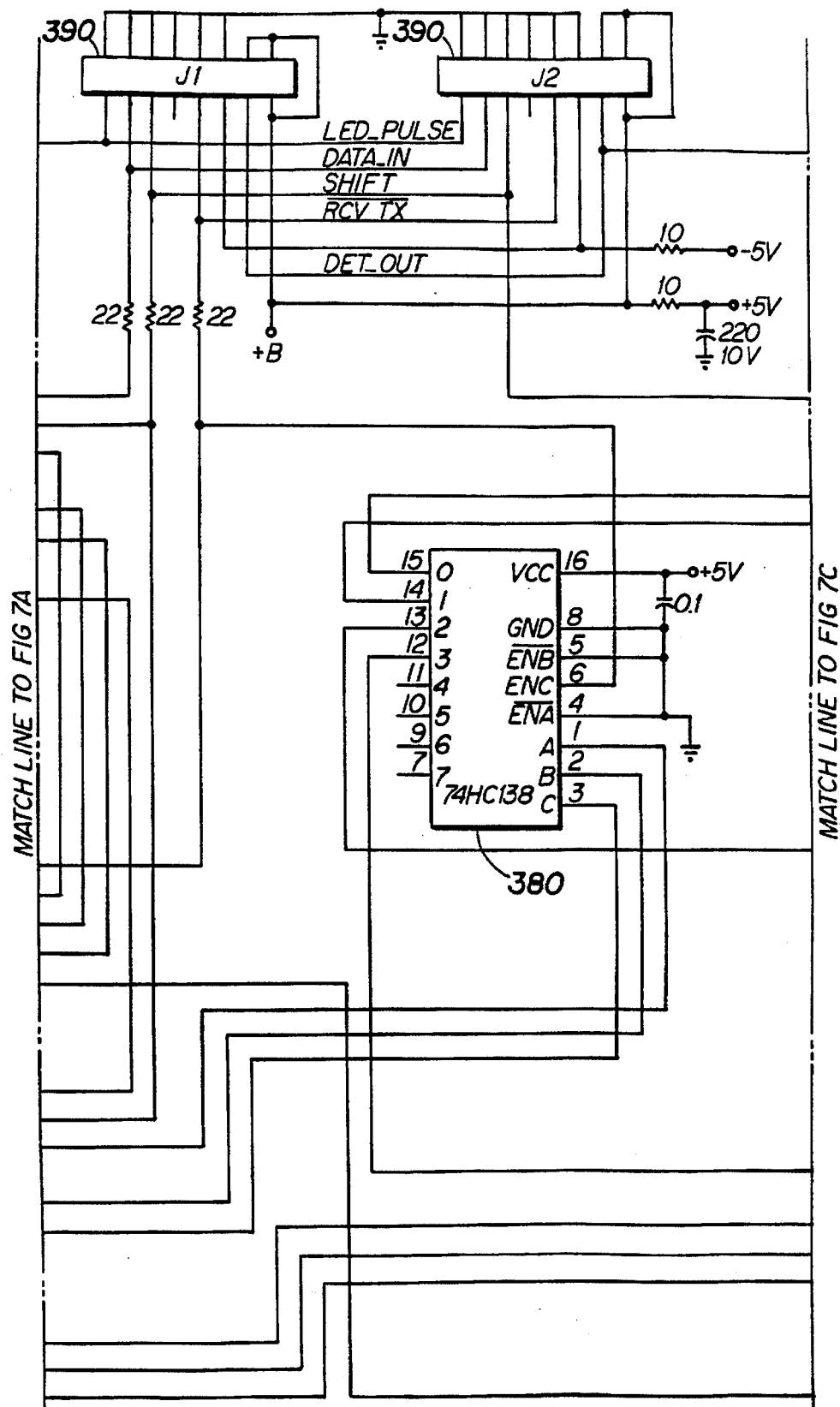
Figure 7C:
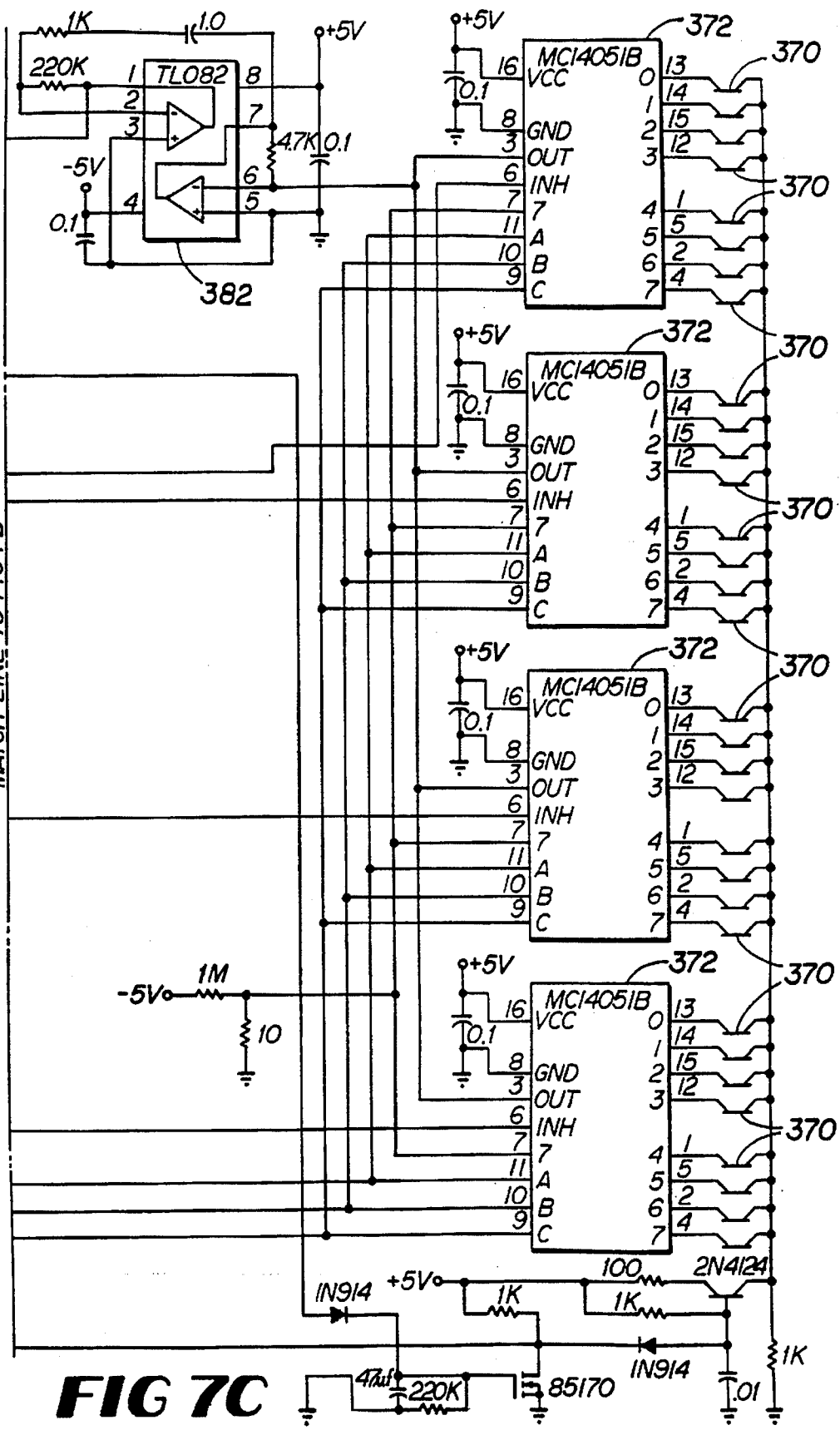

As shown in FIG. 7, the control electronics 350 comprises a plurality of infrared light emitting diodes (IRLEDs) 352 (such as LD271 GaAs Infrared Emitters from Siemens Electronics) organized into banks of eight. The IRLEDs 352 act as light sources and receive power from a plurality of bipolar junction transistors 354. The transistors 354 are driven by a first 3-line to 8-line decoder 356 and a second 3-line to 8-line decoder 360 (suitable decoders include 74HC138 decoders from Texas Instruments). The first decoder 356 selects the individual light emitting diode 352 within a bank to be energized and the second decoder 360 selects the bank to be energized. A pair of shift registers 358 (such as a 74HC 164 shift register from Texas Instruments) provide switching input to the decoders 356, 360 to cause the IRLEDs 352 to be cycled. The shift registers 358 receive sequential input from an off board control means (shown in FIG. 8) through a connector 390.

Light from the IRLEDs 352 is received by a plurality of phototransistors 370 (such as BP 103B Phototransistors from Siemens Electronics) acting as detectors. Output from the phototransistors 370 is fed through a plurality of selectors 372 (such as MC14051B selectors) to a pair of operational amplifiers 382 (such as TL082 op amps from Texas Instruments). The switching of the selectors 372 is controlled by a decoder 380 that also receives switching input from the shift registers 358. All electronic connections from the control electronics 350 to any off-board devices (not shown) are made through the connectors 390. The outputs from the op amps 382 are sent off-board to suitable calculating means (of the type obvious to those skilled in the art) to further process the location of the object as required by the specific application.

Figure 8:
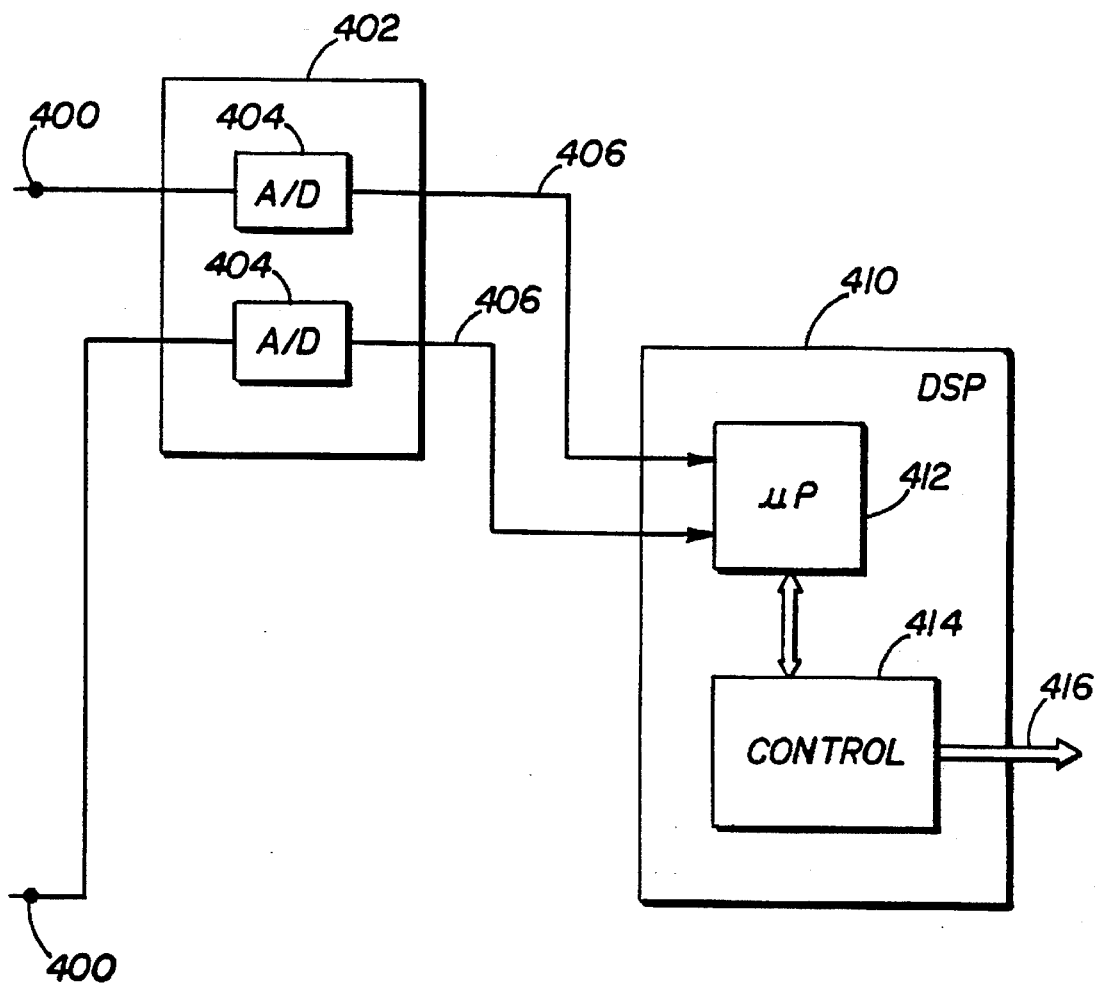
FIG. 8 is a schematic view of the digital signal processing means.

As shown in FIG. 8, analog outputs 400 from the op amps are fed into an analog-to-digital converter chip 402 containing two analog-to-digital converters 404. Each analog output 400 corresponds to the output of each of the circuit boards disposed around the CRT (as shown in FIG. 6). The analog-to-digital converters 404 produce digital signals 406 that are fed into a digital signal processing (DSP) chip 410. The DSP chip 410 comprises a calculating means 412 and a control means 414. The calculating means 414 receives the digital signals 406 and calculates the location of the object as described above. The control means 414 controls the calculating means 412 and provides a control output 416 to the components on the circuit boards disposed around the CRT.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A device for detecting the location of an object on a surface, comprising:
   a. a first plurality of light sources disposed along a first row adjacent the surface, each said light source producing a divergent beam and each being capable of being illuminated at a different time, so that when the object intersects the surface, the object occludes a portion of the beams from at least two different said light sources at different times;
   b. a first plurality of light detectors disposed along a second row adjacent the surface and spaced apart from the first row of said light sources, each said light detector having a detecting surface sensitive to light of the waveband produced by said light sources and each said light detector generating an analog signal representative of the intensity of light being detected, wherein the beam from each of said light sources is directed toward at least one light detector;
   c. control means for causing each of said light sources to be illuminated at a selectable time; and
   d. calculating means, responsive to said control means and to said analog signal from each of said plurality of light detectors, for determining the location of the object based on the intensity of light being detected by each of said plurality of detectors as the object is being illuminated by one of the first plurality of light sources.

2. The device of claim 1, wherein said light sources produce light in the infra-red waveband.

3. The device of claim 1, wherein said calculating means further comprises means for determining the width of the object.

4. The device of claim 3, wherein the object casts a first shadow, having a first upper end and an opposite first lower end, on said plurality of detectors when illuminated by a first light source of said plurality of light sources, and the object casts a second shadow, having a second upper end and an opposite second lower end, on said plurality of detectors when illuminated by a second light source of said plurality of light sources and wherein said calculating means determines the coordinates of:
   a. a first upper line from said first light source to said first upper end of said first shadow;
   b. a first lower line from said first light source to an said first lower end of said first shadow;
   c. a second upper line from said second light source to said second upper end of said second shadow; and
   d. a second lower line from said second light source to said second lower end of said second shadow, and wherein said calculating means determines the width of the object by calculating a distance between a first intersection point and a second intersection point, said first intersection point being a point where said first upper line intersects said second upper line and said second intersection point being the point where said first lower line intersects said second lower line.

5. The device of claim 1 employed in a touch screen.

6. The device of claim 1, further comprising
   a. a second plurality of light sources evenly spaced apart and interleaved with said first plurality of light detectors; and
   b. a second plurality of light detectors evenly spaced apart and interleaved with said first plurality of light sources.

7. A device for detecting the location of an object on a surface, comprising:
   a. a first plurality of light sources disposed along a first row adjacent the surface, each said light source producing a divergent beam and each being capable of being illuminated at a different time, so that when the object intersects the surface, the object occludes a portion of the beams from at least two different said light sources at different times;
   b. a first plurality of light detectors disposed along a second row adjacent the surface and spaced apart from the first row of said light sources, each said light detector having a detecting surface sensitive to light of the waveband produced by said light sources and each said light detector generating an analog signal representative of the intensity of light being detected, wherein the beam from each of said light sources is directed toward at least one light detector;
   c. control means for causing each of said light sources to be illuminated at a selectable time; and
   d. calculating means, responsive to said control means and to said analog signal from each of said plurality of light detectors, for determining the location of the object based on the intensity of light being detected by each of said plurality of detectors, as the object is being illuminated by one of the first plurality of light sources, wherein said calculating means determines the location of the object by determining coordinates relative to the device of a first line and a second line, said first line extending from a first light source to a centerpoint of a first shadow cast by the object upon a first neighboring group of said detectors when said first light source is illuminated and said second line extending from a second light source to a centerpoint of a second shadow cast by the object upon a second neighboring group of said detectors when said second light source is illuminated, the location of the object being at the intersection of the first line and the second line.

8. The device of claim 7, wherein said calculating means determines said centerpoint for each shadow by calculating one half of the distance from a first shadow end to a second shadow end.

9. The device of claim 8, wherein said calculating means determines the location of each shadow end as being at a point from an end of a detector located at a distance equal to the width of said detector times the value of said signal from said detector divided by the value of said signal corresponding to said detector being fully illuminated by a beam.

10. The device of claim 7, wherein said light sources produce light in the infra-red waveband.

11. The device of claim 7, wherein said calculating means further comprises means for determining the width of the object.

12. The device of claim 11, wherein the object casts a first shadow, having a first upper end and an opposite first lower end, on said plurality of detectors when illuminated by a first light source of said plurality of light sources, and the object casts a second shadow, having a second upper end and an opposite second lower end, on said plurality of detectors when illuminated by a second light source of said plurality of light sources and wherein said calculating means determines the coordinates of:

a. a first upper line from said first light source to said first upper end of said first shadow;
  b. a first lower line from said first light source to an said first lower end of said first shadow;
  c. a second upper line from said second light source to said second upper end of said second shadow; and
  d. a second lower line from said second light source to said second lower end of said second shadow, and wherein said calculating means determines the width of the object by calculating a distance between a first intersection point and a second intersection point, said first intersection point being a point where said first upper line intersects said second upper line and said second intersection point being the point where said first lower line intersects said second lower line.

13. The device of claim 7 employed in a touch screen.

14. The device of claim 7, further comprising
  a. a second plurality of light sources evenly spaced apart and interleaved with said first plurality of light detectors; and
  b. a second plurality of light detectors evenly spaced apart and interleaved with said first plurality of light sources.

15. A method of detecting the location of an object on a surface, comprising the steps of:
  a. generating a plurality of divergent light beams with a plurality of light sources evenly spaced apart along a first line coplanar with the surface;
  b. illuminating the object with said plurality of beams so that each beam illuminates the object at a different time;
  c. detecting the intensity of light from at least two of said beams illuminating a plurality of detectors evenly spaced apart along a second line parallel to and coplanar with said first line, each detector generating a signal representative of the intensity of light being received by said detector;
  d. determining a first endpoint and a second endpoint of each shadow cast upon said plurality of detectors by the object as it is being illuminated by each of said beams based upon said signals representative of said intensity received from said plurality of detectors;
  e. determining the coordinates of a centerline from a light source through a point near the center of the object by determining the point one-halfway between said first endpoint and said second endpoint of each shadow cast upon said plurality of detectors by the object; and
  f. determining a centerpoint of the object by determining an intersection point of two centerlines from two of said light sources through the centerpoint of the object.

16. The method of claim 15 employed in a touch screen.

17. A device for determining a distance of an object from an axis, comprising:
  a. a first plurality of light sources evenly spaced apart along a first row;
  b. a first plurality of light detectors evenly spaced apart along said first row;
  c. a second plurality of light sources evenly disposed along a second row;
  d. a second plurality of light detectors disposed along said second row and interleaved with said second plurality of light sources;
  e. means for determining a length of a shadow cast upon said first plurality of detectors by the object as the object is illuminated by at least one of said first plurality of light sources and for determining the length of a shadow cast upon said second plurality of detectors by the object; and
  f. means for determining the distance of the object from the first row by multiplying the distance between said first row and said second row by the ratio of the length of a first shadow cast upon said second plurality of detectors by the object as the object is illuminated by a first light source of said first plurality of light sources, divided by the length of a second shadow cast upon said first plurality of detectors by the object as it is illuminated by a second light source of said second plurality of light sources.

18. The device of claim 17 employed on a touch screen.

19. A method of determining the location of an end of a shadow, comprising the steps of:
  a. detecting light with a plurality of light detectors, each detector having a width;
  b. generating an analog signal proportional to the intensity of light detected by each of said detectors;
  c. determining which detector of said detectors is a partially occluded detector, said partially occluded detector being a detector generating an analog signal having an intermediate value between a value corresponding to a detector that is fully exposed to light and a value corresponding to a detector fully occluded by a shadow, said partially occluded detector having an unoccluded end and an occluded end;
  d. determining which end of said partially occluded detector is unoccluded; and
  e. multiplying the width of said partially occluded detector by said intermediate value, divided by a value corresponding to a signal from a detector that is completely unoccluded, thereby determining a distance of the end of the shadow from the unoccluded end of said partially occluded detector.

20. The method of claim 19 wherein the step of determining which end of said partially occluded detector is in the relatively bright area further comprises the step of determining which of said detectors adjacent said partially occluded detector are completely unoccluded.

* * * * *